United States Patent
Mondino et al.

(10) Patent No.: US 9,505,966 B2
(45) Date of Patent: Nov. 29, 2016

(54) REFRIGERANT MIXTURES

(71) Applicant: TAZZETTI S.p.A., Volpiano (IT)

(72) Inventors: Riccardo Mondino, La Loggia (IT); Valentina Longoni, S. Maurizio Canavese (IT)

(73) Assignee: TAZZETTI S.p.A., Volpiano (Turin) (IT)

(*) Notice: Subject to any disclaimer, the term of this patent is extended or adjusted under 35 U.S.C. 154(b) by 0 days.

(21) Appl. No.: 14/414,460

(22) PCT Filed: Jul. 16, 2013

(86) PCT No.: PCT/IB2013/055833
§ 371 (c)(1),
(2) Date: Jan. 13, 2015

(87) PCT Pub. No.: WO2014/013427
PCT Pub. Date: Jan. 23, 2014

(65) Prior Publication Data
US 2015/0166865 A1   Jun. 18, 2015

(30) Foreign Application Priority Data
Jul. 16, 2012 (IT) .............................. TO2012A0626

(51) Int. Cl.
C09K 5/04 (2006.01)
F25B 45/00 (2006.01)

(52) U.S. Cl.
CPC .............. C09K 5/042 (2013.01); F25B 45/00 (2013.01); C09K 2205/11 (2013.01); C09K 2205/12 (2013.01); C09K 2205/40 (2013.01)

(58) Field of Classification Search
CPC .. C09K 5/041; C09K 5/042; C09K 2205/11; C09K 2205/12; C09K 2205/40
See application file for complete search history.

(56) References Cited

U.S. PATENT DOCUMENTS

2009/0261289 A1   10/2009   Ham et al.

FOREIGN PATENT DOCUMENTS

DE     4313584 A1   10/1994
WO     WO 99/29799   *   6/1999

OTHER PUBLICATIONS

S. Horstmann; "Vapor-liquid Equilibrium and Excess Enthalpy Data for the Binary Systems Propane + Dimethyl Ether and Propene + Dimethyl Ether at Temperatures from K"; J. Chem. Eng. Data; vol. 49, Jan. 2004; pp. 38-42.

Miyara et al.; "Condensation of Hydrocarbons—a Review"; International Journal of Refrigeration, Editions Elsevier (Paris, FR); vol. 31, No. 4; Jun. 1, 2008, pp. 621-632.

* cited by examiner

*Primary Examiner* — John Hardee
(74) *Attorney, Agent, or Firm* — Thomas Horstemeyer, LLP

(57) ABSTRACT

A method providing a replacement or alternative refrigerant, wherein the replacement of alternative refrigerant is a gaseous mixture, selected from: the gaseous mixture consisting of:
dimethyl ether in a concentration from 85% to 95% by weight and propylene in a concentration from 5% to 15% by weight, and the gaseous mixture consisting of:
dimethyl ether in a concentration from 71% to 85% by weight and propane in a concentration from 15% to 29% by weight as a replacement or alternative refrigerant for R134a and/or for other refrigerants which are replacements or alternatives to R134a containing HFC (hydrofluorocarbons), HFO (hydrofluoro olefins) and HFE (hydrofluoro ethers).

11 Claims, 2 Drawing Sheets

REFRIGERANT MIXTURES

CROSS-REFERENCE TO RELATED APPLICATION

This application is the 35 U.S.C. §371 national stage of PCT Application No. PC/IB2013/055833, filed Jul. 16, 2013, which is herein incorporated by reference in its entirety and which also claims priority to, and the benefit of, Italian Patent Application TO2012A000626, filed Jul. 16, 2012, which is herein incorporated by reference in its entirety.

The present invention relates to gas mixtures that are useful as replacement or alternative refrigerants for R134a.

R134a (1,1,1,2-tetrafluoroethane) is a hydrofluorocarbon which has been used since the start of the 1990s as a replacement refrigerant gas for chlorofluorocarbons or hydrochlorofluorocarbons, which have a substantial ozone depletion potential (ODP hereinbelow) and which are regulated by the Montreal protocol.

Unlike chlorofluorocarbons or hydrochlorofluorocarbons, R134a does not have a substantial ODP and has found and finds application particularly as a refrigerant for air conditioning or refrigeration.

However, R134a has a high global warming potential (GWP hereinbelow), and, following the Kyoto protocol, the European regulation has limited and will gradually limit its availability and use in air-conditioning or refrigeration plants.

The document S. Horstsmann, J. Chem. Eng. Data, Vol. 49, pp. 38-42, 01-2004 gives thermodynamic data for propanedimethyl ether and propenedimethyl ether mixtures at temperatures from 298 to 323 degrees Kelvin.

The main aim of the present invention is to provide refrigerant gas mixtures that may be used as replacements or alternatives to R134a, and/or other replacement or alternative refrigerants for R134a containing HFC (hydrofluorocarbons), HFO (hydrofluoro olefins) and HFE (hydrofluoro ethers), which have a lower production cost and improved environmental impact characteristics, particularly in terms of the GWP, relative to those of R134a, together with thermodynamic properties that are suitable for their use as replacement refrigerant gases with improved characteristics in applications as air conditioning for motor vehicles, and domestic, commercial and industrial air conditioning and refrigeration.

The invention is based on the acknowledgement that the abovementioned aims may be achieved by using a gaseous mixture not comprising fluorinated hydrocarbons, with relative concentrations of the two constituent gases of the mixture that are within a quite limited range.

In this respect, the present invention provides mixtures which, by virtue of a specific selection of the concentration ranges of the hydrocarbons used, make it possible to obtain thermodynamic characteristics that are particularly suitable and improved for replacing R134a.

A subject of the invention is thus the use of a gaseous mixture, selected from the group consisting of:

dimethyl ether in a concentration from 85% to 95% by weight and propylene in a concentration from 5% to 15% by weight, and dimethyl ether in a concentration from 71% to 85% by weight and propane in a concentration from 15% to 29% by weight as a replacement or alternative refrigerant gas for R134a, in air-conditioning or refrigeration plants, particularly in motor vehicle air conditioning designed for the use of R134a.

The mixtures according to the invention find use both in brand new installations and in the retrofit of existing installations, requiring only the replacement of certain components since the mixtures according to the invention are flammable.

In particular, the mixtures according to the invention find an application in air-conditioning systems of motor vehicles, refrigerated cabinets for supermarkets, cold stores, domestic refrigerators, centrifugal chillers, domestic, commercial and industrial air-conditioning plants, domestic, commercial and industrial chillers, air-conditioning or refrigeration plants in the process industry, refrigerated transport, chilled water dispensers, commercial ice machines, and domestic, commercial and industrial dehumidifiers.

Air-conditioning or refrigeration plants which use the mixtures according to the invention as refrigerant also fall within the scope of the invention.

Within the scope of the already limited concentration range of the constituent gases of the mixtures, preferred mixtures are those selected from the group consisting of:

91-95% by weight and particularly 92% by weight of dimethyl ether and 5% to 9% by weight and particularly 8% by weight of propylene, and 77-83% by weight and particularly 79% by weight of dimethyl ether and 23% to 17% by weight and particularly 21% by weight of propane.

The mixtures proposed herein have improved characteristics relative to the use of R134a in refrigeration cycles for moderate and high temperature applications.

The table which follows illustrates a number of salient characteristics relating to the thermodynamic properties of the mixtures according to the invention within the scope of the concentration ranges mentioned above, together with the salient environmental impact characteristics thereof, such as the ODP and the GWP, compared with the corresponding properties of R134a.

TABLE 1

|  | Boiling point ° C. | GLIDE ° C. | ODP | GWP |
| --- | --- | --- | --- | --- |
| DME/Propylene | −31.7 ÷ −27.3 | 3.9-1.8 | 0 | 1.0-1.1 |
| DME/Propane | −36.1 ÷ −32.5 | 5.5-4.8 | 0 | 1.3-1.6 |
| R134a | −26.3 | — | 0 | 1300 |

As it is seen from the table given above, the mixtures used according to the invention have low glide values (difference between the boiling point and the dew point at a pressure of 1 atmosphere).

In comparison with R134a, the mixtures drastically reduce the GWP from 1300 to values generally not exceeding 1.6.

Figure 1:
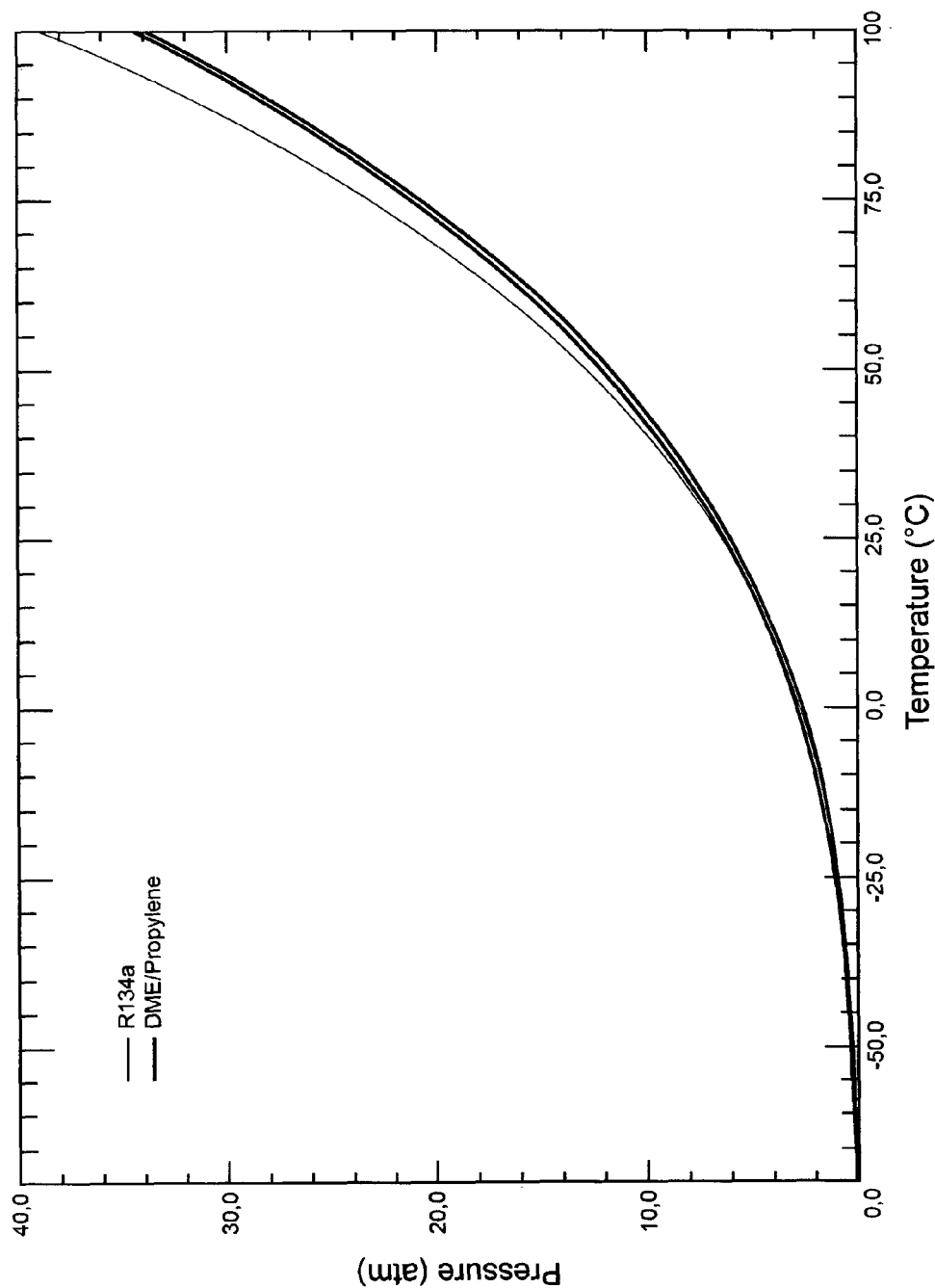
FIGS. 1 and 2 are diagrams illustrating the pressure and temperature curves for the preferred mixtures according to the invention compared with the corresponding curves relating to R134a; the relevant numerical values are given in Tables 3 and 4.
Figure 2:
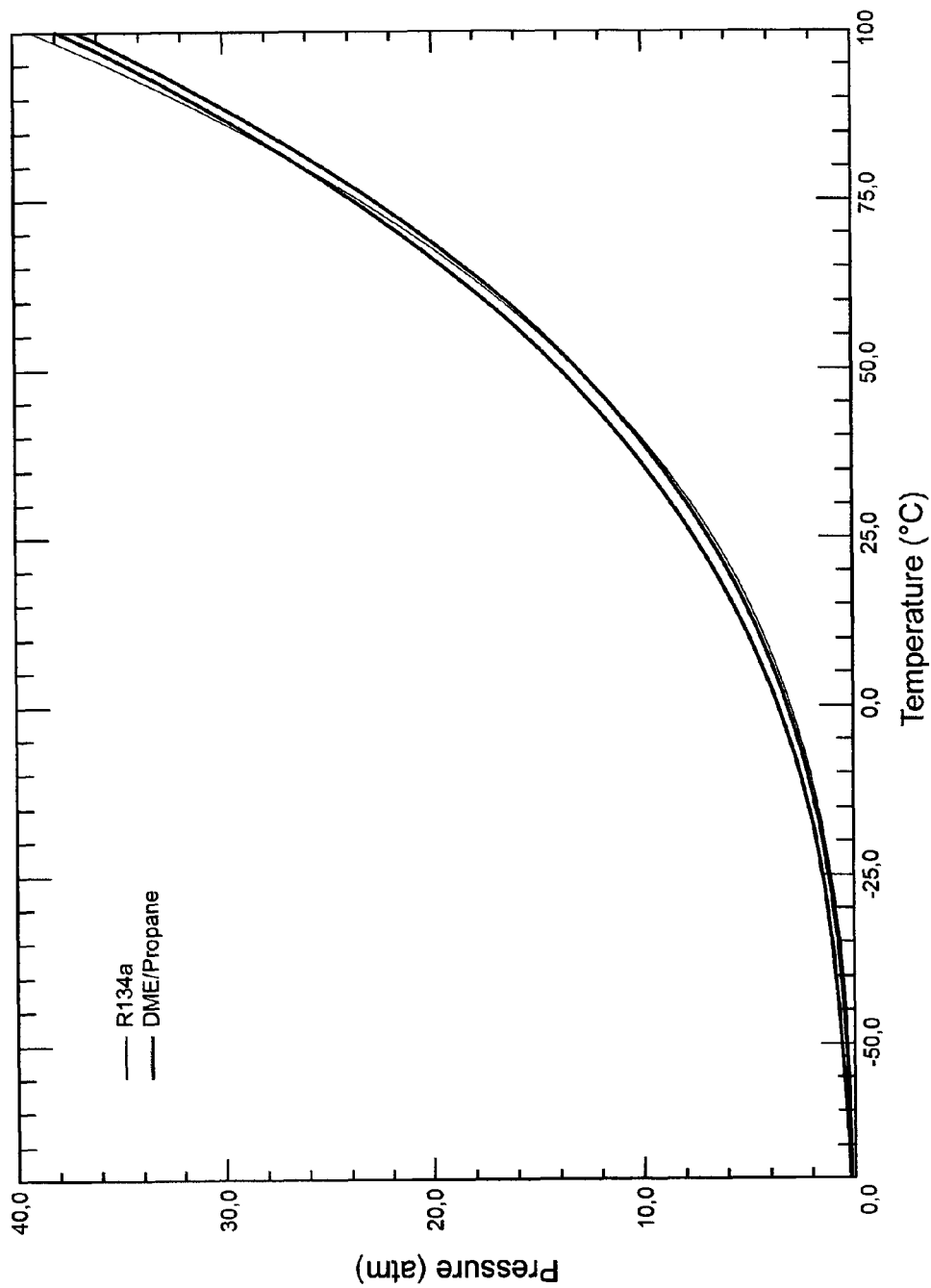

A comparative table between R134a and the replacements that are the subject of the present invention is presented hereinbelow.

TABLE 2

| % | Refrigerant | COPh | COPc |
|---|---|---|---|
| pure | R134a | 3.808 | 2.877 |
| 92/8 | DME/Propylene | 3.758 | 2.826 |
| 79/21 | DME/Propane | 3.666 | 2.735 |

The table describes the coefficients of performance (COP) for specific mixtures that are the subject of the invention, compared with R134a.

The coefficients of performance in heating (COPh) and in cooling (COPc) are indicated in the table.

The values were calculated for an air-conditioning plant with a thermal capacity of 6 KW in cooling, 500 W of auxiliary power and subcooling by 5° C. The excess heat was considered as additional heat to the condenser.

The indicated values are the result of a mathematical simulation based on thermodynamic data known from the literature, exploiting internationally recognised programs.

It may be observed that the COP of the proposed mixtures is entirely in line with that of pure R134a.

TABLE 3

DME/Propylene (92/8): P/T Table

| T ° C. | P R134a atm | $P^L$ mix atm | $P^V$ mix atm |
|---|---|---|---|
| −70 | 0.08 | 0.11 | 0.09 |
| −65 | 0.11 | 0.16 | 0.13 |
| −60 | 0.16 | 0.21 | 0.17 |
| −55 | 0.22 | 0.28 | 0.23 |
| −50 | 0.29 | 0.36 | 0.31 |
| −45 | 0.39 | 0.47 | 0.41 |
| −40 | 0.51 | 0.60 | 0.52 |
| −35 | 0.65 | 0.76 | 0.67 |
| −30 | 0.83 | 0.95 | 0.85 |
| −25 | 1.05 | 1.18 | 1.06 |
| −20 | 1.31 | 1.44 | 1.31 |
| −15 | 1.62 | 1.76 | 1.60 |
| −10 | 1.98 | 2.12 | 1.94 |
| −5 | 2.40 | 2.53 | 2.34 |
| 0 | 2.89 | 3.01 | 2.79 |
| 5 | 3.45 | 3.55 | 3.31 |
| 10 | 4.09 | 4.16 | 3.90 |
| 15 | 4.82 | 4.85 | 4.57 |
| 20 | 5.64 | 5.62 | 5.32 |
| 25 | 6.57 | 6.48 | 6.15 |
| 30 | 7.60 | 7.43 | 7.08 |
| 35 | 8.75 | 8.48 | 8.12 |
| 40 | 10.03 | 9.64 | 9.26 |
| 45 | 11.45 | 10.92 | 10.51 |
| 50 | 13.01 | 12.31 | 11.89 |
| 55 | 14.72 | 13.83 | 13.39 |
| 60 | 16.60 | 15.49 | 15.03 |
| 65 | 18.65 | 17.28 | 16.81 |
| 70 | 20.89 | 19.23 | 18.74 |
| 75 | 23.33 | 21.33 | 20.83 |
| 80 | 25.99 | 23.61 | 23.10 |
| 85 | 28.88 | 26.05 | 25.54 |
| 90 | 32.02 | 28.68 | 28.17 |
| 95 | 35.44 | 31.51 | 31.00 |
| 100 | 39.20 | 34.55 | 34.05 |

TABLE 4

DME/Propane (79/21): P/T Table

| T ° C. | P R134a atm | $P^L$ mix atm | $P^V$ mix atm |
|---|---|---|---|
| −70 | 0.08 | 0.16 | 0.10 |
| −65 | 0.11 | 0.22 | 0.14 |
| −60 | 0.16 | 0.29 | 0.20 |
| −55 | 0.22 | 0.38 | 0.26 |
| −50 | 0.29 | 0.48 | 0.35 |
| −45 | 0.39 | 0.62 | 0.46 |
| −40 | 0.51 | 0.78 | 0.59 |
| −35 | 0.65 | 0.97 | 0.76 |
| −30 | 0.83 | 1.20 | 0.95 |
| −25 | 1.05 | 1.47 | 1.19 |
| −20 | 1.31 | 1.78 | 1.47 |
| −15 | 1.62 | 2.14 | 1.79 |
| −10 | 1.98 | 2.56 | 2.17 |
| −5 | 2.40 | 3.04 | 2.61 |
| 0 | 2.89 | 3.58 | 3.11 |
| 5 | 3.45 | 4.19 | 3.68 |
| 10 | 4.09 | 4.88 | 4.33 |
| 15 | 4.82 | 5.65 | 5.06 |
| 20 | 5.64 | 6.51 | 5.88 |
| 25 | 6.57 | 7.47 | 6.79 |
| 30 | 7.60 | 8.52 | 7.81 |
| 35 | 8.75 | 9.68 | 8.93 |
| 40 | 10.03 | 10.96 | 10.17 |
| 45 | 11.45 | 12.35 | 11.53 |
| 50 | 13.01 | 13.87 | 13.01 |
| 55 | 14.72 | 15.52 | 14.64 |
| 60 | 16.60 | 17.32 | 16.41 |
| 65 | 18.65 | 19.26 | 18.33 |
| 70 | 20.89 | 21.36 | 20.42 |
| 75 | 23.33 | 23.63 | 22.68 |
| 80 | 25.99 | 26.07 | 25.11 |
| 85 | 28.88 | 28.70 | 27.75 |
| 90 | 32.02 | 31.52 | 30.58 |
| 95 | 35.44 | 34.55 | 33.64 |
| 100 | 39.20 | 37.81 | 36.94 |

The invention claimed is:

1. A method comprising:
   providing a replacement or alternative refrigerant, wherein the replacement or alternative refrigerant is a gaseous mixture, selected from the group consisting of:
   the gaseous mixture consisting of:
   dimethyl ether in a concentration from 85% to 95% by weight and propylene in a concentration from 5% to 15% by weight, and
   the gaseous mixture consisting of:
   dimethyl ether in a concentration from 71% to 85% by weight and propane in a concentration from 15% to 29% by weight as a replacement or alternative refrigerant for R134a and/or for other refrigerants which are replacements or alternatives to R134a containing HFC (hydrofluorocarbons), HFO (hydrofluoro olefins) and HFE (hydrofluoro ethers).

2. The method of claim 1, wherein the mixture consists of:
   dimethyl ether in a concentration from 91% to 95% by weight, and
   propylene in a concentration from 5% to 9% by weight.

3. The method of claim 1, wherein the mixture consists of 92% by weight of dimethyl ether and 8% by weight of propylene.

4. The method of claim 1, wherein the mixture consists of:
   dimethyl ether in a concentration from 77% to 83% by weight, and
   propane in a concentration from 23% to 17% by weight.

5. the method of claim 1, wherein said mixture consists of 79% by weight of dimethyl ether and 21% by weight of propane.

6. the method of claim 1, wherein said gaseous mixture is used in air-conditioning or refrigeration plants.

7. The method of claim 1, wherein said gaseous mixture is used in air-conditioning systems of motor vehicles, refrigerated cabinets for supermarkets, cold stores, domestic refrigerators, centrifugal chillers, domestic, commercial and industrial air-conditioning plants, domestic, commercial and industrial chillers, air-conditioning or refrigeration plants in the process industry, refrigerated transport, chilled water dispensers, commercial ice machines, and domestic, commercial and industrial dehumidifiers.

8. An air conditioning or refrigeration plant containing, as a refrigerant, a gaseous mixture selected from the group consisting of:
the gaseous mixture consisting of:
dimethyl ether in a concentration from 85% to 95% by weight and propylene in a concentration from 5% to 15% by weight, and
the gaseous mixture consisting of:
dimethyl ether in a concentration from 71% to 85% by weight and propane in a concentration from 15% to 29% by weight as a replacement or alternative refrigerant for R134a and/or for other refrigerants which are replacements or alternatives to R134a containing HFC (hydrofluorocarbons), HFO (hydrofluoro olefins) and HFE (hydrofluoro ethers).

9. The air-conditioning or refrigeration plant according to claim 8, designed or adapted for the use of a mixture according to claim 1 as a refrigerant.

10. The air-conditioning or refrigeration plant according to claim 8, consisting of air-conditioning systems of motor vehicles, refrigerated cabinets for supermarkets, cold stores, domestic refrigerators, centrifugal chillers, domestic, commercial and industrial air-conditioning plants, domestic, commercial and industrial chillers, air-conditioning or refrigeration plants in the process industry, refrigerated transport, chilled water dispensers, commercial ice machines, and domestic, commercial and industrial dehumidifiers.

11. A retrofitting process in existing air-conditioning or refrigeration plants, comprising the replacement of the refrigerant gas used in said plant with a gaseous mixture selected from the group consisting of:
the gaseous mixture consisting of:
dimethyl ether in a concentration from 85% to 95% by weight and propylene in a concentration from 5% to 15% by weight, and
the gaseous mixture consisting of:
dimethyl ether in a concentration from 71% to 85% by weight and propane in a concentration from 15% to 29% by weight.

* * * * *